United States Patent
Huester et al.

(10) Patent No.: US 11,293,618 B2
(45) Date of Patent: Apr. 5, 2022

(54) METHOD FOR CONTROLLING TWO LIGHTING MODULES OF A HEADLIGHT

(71) Applicant: HELLA GmbH & Co. KGaA, Lippstadt (DE)

(72) Inventors: Christian Huester, Salzkotten (DE); Boris Kubitza, Moehnesee-Koerbecke (DE); Martin Pluempe, Lippstadt (DE); Udo Venker, Guetersloh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/344,624

(22) Filed: Jun. 10, 2021

(65) Prior Publication Data

US 2021/0388962 A1     Dec. 16, 2021

(30) Foreign Application Priority Data

Jun. 10, 2020 (DE) ...................... 10 2020 115 384.8

(51) Int. Cl.
*F21S 41/65*     (2018.01)
(52) U.S. Cl.
CPC ..................................... *F21S 41/65* (2018.01)
(58) Field of Classification Search
CPC ......... F21S 41/65; B60Q 1/1415; B60Q 1/18; B60Q 1/085; B60Q 1/1423; B60Q 1/143
See application file for complete search history.

(56) References Cited

U.S. PATENT DOCUMENTS

| 8,842,176 B2* | 9/2014 | Schofield | H04N 7/18 |
| | | | 348/113 |
| 2008/0239746 A1 | 10/2008 | Wuller et al. | |
| 2017/0113599 A1* | 4/2017 | Park | B60Q 1/085 |

FOREIGN PATENT DOCUMENTS

| DE | 102005041234 A1 | 3/2007 |
| DE | 102016001915 A1 | 8/2017 |
| DE | 102016003814 A1 | 9/2017 |
| DE | 102018130512 A1 | 6/2020 |

* cited by examiner

*Primary Examiner* — Anne M Hines
(74) *Attorney, Agent, or Firm* — Muncy, Geissler, Olds & Lowe, P.C.

(57) ABSTRACT

A method for controlling two lighting modules of a headlight, including the following steps: definition of a non-dazzling region, wherein the non-dazzling region is at least within the second region; reduction of the brightness of the light emitted by the two lighting modules toward the non-dazzling region; determination as to whether an adjacent region exists that directly adjoins the non-dazzling region horizontally and that is a horizontal edge region of the first region; and reduction of the brightness of the light emitted by the first lighting module toward the adjacent region if the adjacent region has been determined.

10 Claims, 2 Drawing Sheets

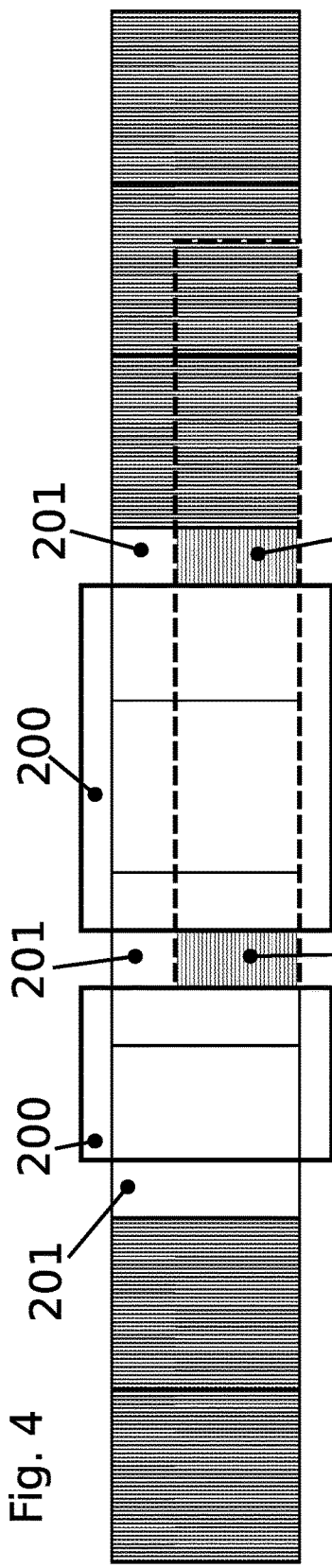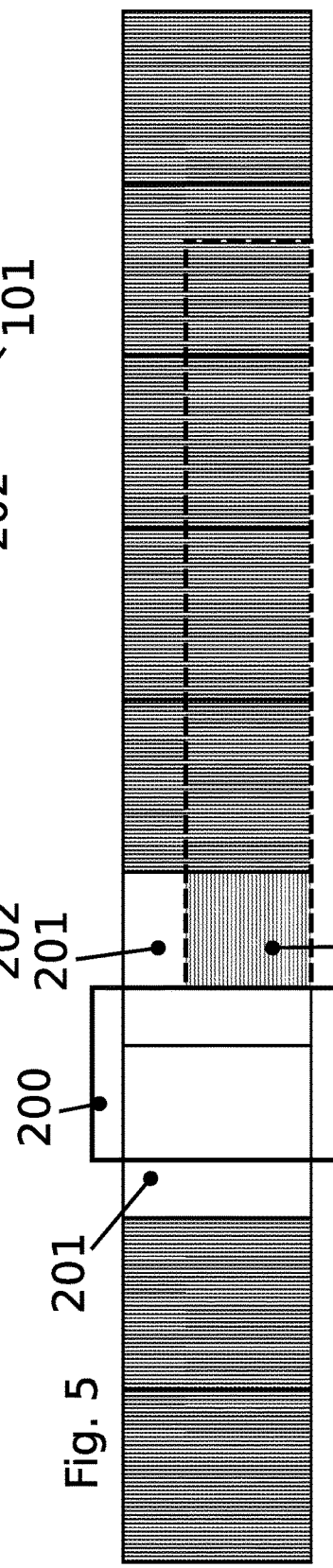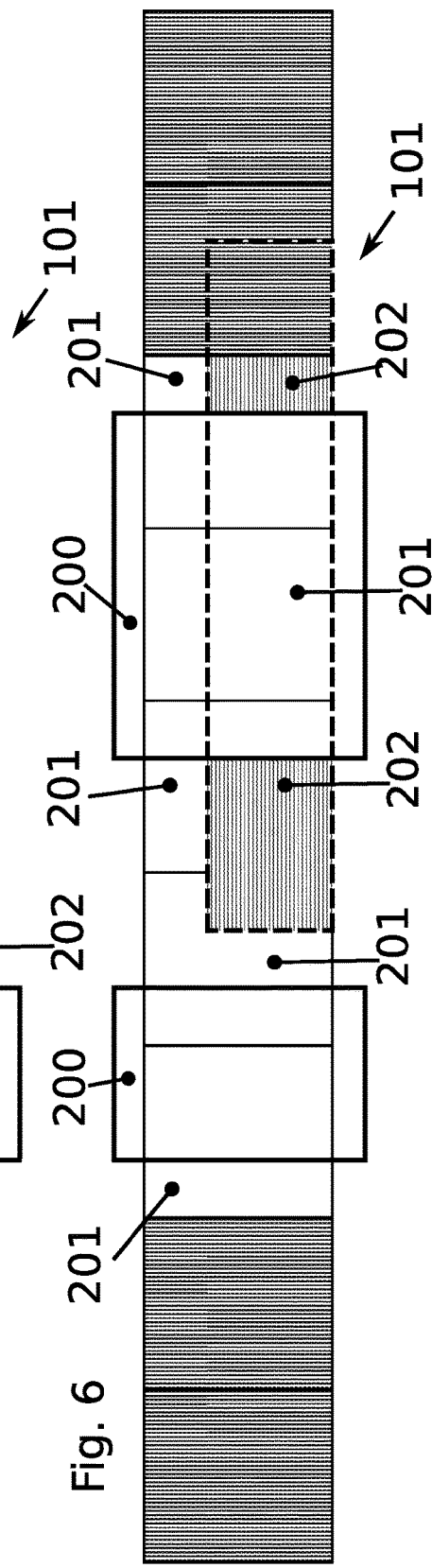

METHOD FOR CONTROLLING TWO LIGHTING MODULES OF A HEADLIGHT

This nonprovisional application claims priority under 35 U.S.C. § 119(a) to German Patent Application No. 10 2020 115 384.8, which was filed in Germany on Jun. 10, 2020, and which is herein incorporated by reference.

BACKGROUND OF THE INVENTION

Field of the Invention

The present invention relates to a method for controlling two lighting modules.

Description of the Background Art

Methods are known from the prior art in which two lighting modules of a headlight are controlled. DE 10 2016 003 814 A1 discloses a method for controlling two lighting modules of a headlight in which other road users are detected. After this detection, a non-dazzling region is defined. The brightness of the light emitted by the headlight toward the non-dazzling region is reduced so that other road users are not dazzled by the headlight.

SUMMARY OF THE INVENTION

It is therefore an object of the present invention to reduce the risk of light artifacts when reducing the brightness of the headlight in a non-dazzling region.

According to an exemplary embodiment 1, a first of the lighting modules is designed to illuminate a first region. A second of the lighting modules is designed to illuminate a second region. The first region comprises a subregion of the second region in this case. It is possible, in particular, that the entire first region is a subregion of the second region.

A non-dazzling region is defined that is within the second region. Preferably, the non-dazzling region is entirely within the second region. The non-dazzling region can be defined, for example, so as to reduce the risk of dazzling another road user. The non-dazzling region can be defined as already known from the prior art.

The brightness of the light emitted by the two modules toward the non-dazzling region is reduced. It is possible, in particular, that no light at all is emitted any longer toward the non-dazzling region by the two modules. It is also possible, however, that the brightness is only reduced such that the non-dazzling region is illuminated with less brightness.

A determination is made as to whether an adjacent region exists that directly adjoins the non-dazzling region horizontally and that is a horizontal edge region of the first region. A horizontal edge region in this context is understood to mean, in particular, that it is a region that comprises a horizontal boundary of the first region.

The brightness of the light emitted by the first lighting module toward the adjacent region is reduced if the adjacent region has been determined. It should be noted here that there can also be additional criteria that must be fulfilled in order for the brightness of the light emitted by the first lighting module toward the adjacent region to be reduced. It is thus possible that it is a necessary condition and not a sufficient condition.

The reduction of the brightness of the light emitted by the first lighting module toward the adjacent region is advantageous for the purpose of reducing the risk of light artifacts. In the prior art, such a light artifact can be produced in the adjacent region by the first lighting module, for example. The risk of these light artifacts is then reduced by the reduction according to the invention of the brightness of the light emitted into the adjacent region. It is especially advantageous in this case when this brightness is matched to the brightness of the light emitted toward the non-dazzling region by the two lighting modules. If, for example, no light is emitted toward the non-dazzling region, it is possible that no light is emitted toward the adjacent region either.

It is advantageous to reduce the risk of light artifacts because they are often perceived by users as bothersome. Moreover, the danger exists that an additional non-dazzling region that is not actually present is suggested to a user on account of a light artifact.

According to an embodiment of the invention, it is possible that the brightness of the light emitted by the first lighting module toward the adjacent region is only reduced in the event that solely the non-dazzling region was defined as the only non-dazzling region that directly adjoins the adjacent region horizontally. If this criterion is met, the probability increases that unwanted light artifacts would be present in the adjacent region without a reduction in brightness. It is therefore advantageous to employ this criterion for the decision as to whether the brightness should be reduced. Otherwise, the brightness in the adjacent region could potentially be reduced even though no unwanted light artifact would have been present without a reduction in brightness. This can be the case, for example, when the adjacent region adjoins two defined non-dazzling regions horizontally.

According to an embodiment of the invention, it is possible that the brightness of the light emitted by the first lighting module toward the adjacent region is only reduced in the event that the adjacent region does not directly horizontally adjoin a section that is illuminated with unreduced brightness by the second lighting module. Within the framework of this description, the term "unreduced brightness" can mean, in particular, that the brightness in this section has not been reduced on account of the detection of the non-dazzling region or of an additional non-dazzling region. If this criterion is met, the probability increases that unwanted light artifacts would be present in the adjacent region without a reduction in brightness. It is therefore advantageous to employ this criterion for the decision as to whether the brightness should be reduced. Otherwise, the brightness in the adjacent region could potentially be reduced even though no unwanted light artifact would have been present without a reduction in brightness. If the adjacent region adjoins a section that is illuminated with unreduced brightness, then no reduction in brightness in the adjacent region is necessary, since the adjacent region is not located between two regions or sections that are less strongly illuminated.

According to an embodiment of the invention, it is possible that the second module comprises multiple lighting segments located horizontally next to one another that are each designed to illuminate one segment of the second region. It is possible, in particular, that the entire second region formed of the segments illuminated by the lighting segments. It is possible in this case that the brightness of the light emitted by the first lighting module toward the adjacent region is only reduced in the event that the adjacent region has a horizontal extent that is smaller than the horizontal extent of one of the segments. If this criterion is met, the probability increases that unwanted light artifacts would be present in the adjacent region without a reduction in brightness. It is therefore advantageous to employ this criterion for the decision as to whether the brightness should be reduced.

Otherwise, the brightness in the adjacent region could potentially be reduced even though no unwanted light artifact would have been present without a reduction in brightness.

The brightness of the segments is reduced in the non-dazzling region. If the edge region now has a larger extent in the horizontal direction than the segments, an illumination of this edge region with unreduced brightness is not considered a bothersome light artifact. If the edge region extends over multiple segments and these two segments are illuminated with reduced brightness by the second lighting module, it is assumed that at least two non-dazzling regions have been defined and that the edge region is located between these two non-dazzling regions.

According to an embodiment of the invention, the first lighting module can include multiple light-emitting diodes as light sources.

According to an embodiment of the invention, the light-emitting diodes can be varied in their brightness individually or as groups, wherein the reduction of the brightness of the light emitted by the first lighting module toward the adjacent region is carried out by a variation of the brightness of individual light-emitting diodes or of groups of light-emitting diodes. It is possible, in particular, that the light-emitting diodes each illuminate a region that is many times smaller than the segments illuminated by the second lighting module.

According to an embodiment of the invention, the first lighting module can be a high-resolution module. This can mean, in particular, that an especially high density of light sources per unit area is present. The first lighting module can be designed, in particular, as a "Solid State Lighting" module (SSL module) or as a "Digital Light Processing" module (DLP module).

According to an embodiment of the invention, the second lighting module can be a matrix module. This can mean, in particular, that the second lighting module includes light-emitting diodes as light sources that are arranged in a matrix.

The system comprises a headlight and a control unit. The headlight comprises two lighting modules. A first of the lighting modules is designed to illuminate a first region. A second of the lighting modules is designed to illuminate a second region. The first region is a subregion of the second region in this case. The control unit is designed to control the lighting modules. The control unit is designed to carry out a method according to an embodiment of the invention.

Features disclosed with regard to the method can likewise be implemented in the system here.

The motor vehicle comprises a system according to an embodiment of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a schematic view of a light distribution with two non-dazzling regions created with a headlight according to an embodiment of the invention;

FIG. 5 is a schematic view of a light distribution with a non-dazzling region created with a headlight according to an embodiment of the invention; and FIG. 6 is a schematic view of a light distribution with two non-dazzling regions created with a headlight according to an embodiment of the invention.

DETAILED DESCRIPTION

Figure 1:
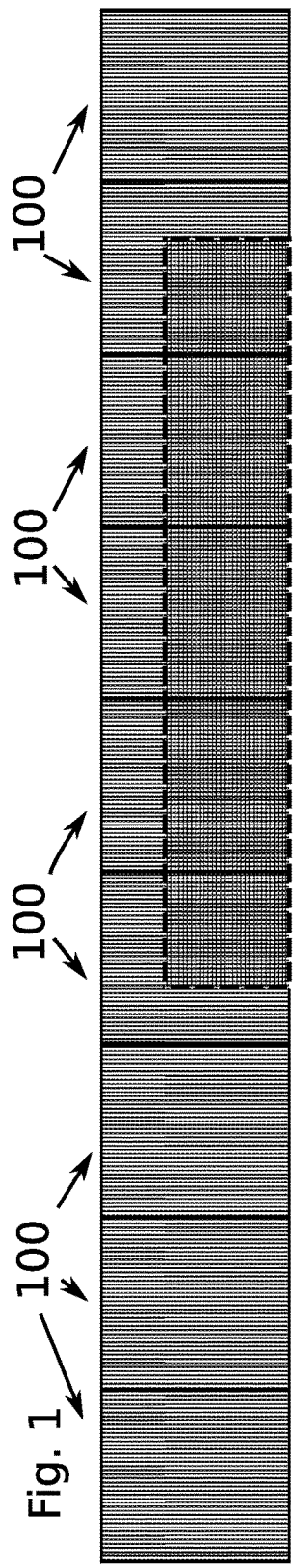
FIG. 1 is a schematic view of a light distribution created with a headlight according to an embodiment of the invention.

Shown in FIG. 1 is a light distribution with a first region 101 that is a subregion of a second region. The second region includes multiple segments 100 here. The first region 101 is illuminated by a first lighting module of a headlight. The second region is illuminated by a second lighting module of the headlight.

The first lighting module can be a high-resolution module, for example, which has a relatively high resolution, but only illuminates the first region 101 that is relatively small in comparison with the second region. Therefore, the second lighting module is used to achieve a larger illumination region. The first lighting module, in contrast, can increase the brightness at especially relevant points. Moreover, as a result of its high resolution, the first lighting module can more precisely delimit non-dazzling regions that are required under some circumstances. On account of the relatively large segments 100, the brightness must oftentimes be reduced in a larger region with the second lighting module than would actually be necessary for glare suppression. The segments 100 illuminated with unreduced brightness are only labeled with reference symbols in FIG. 1 for reasons of clarity. However, they are also present in the other figures and shown in exactly the same way as in FIG. 1.

Figure 2:
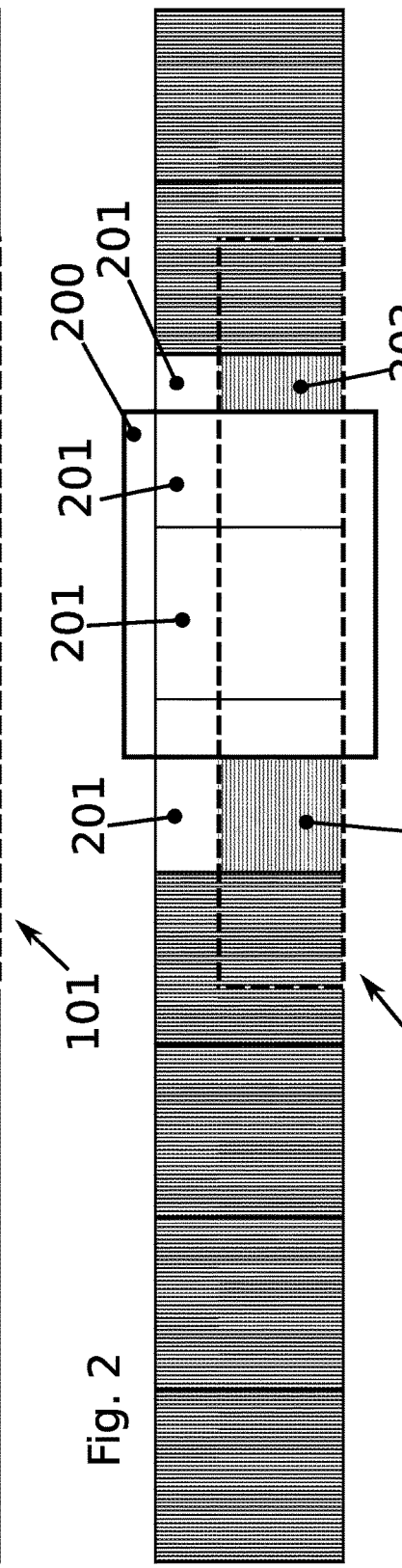
FIG. 2 is a schematic view of a light distribution with a non-dazzling region created with a headlight according to an embodiment of the invention.

In the prior art, these unwanted gaps are always filled by the first lighting module. A non-dazzling region 200 is shown in FIG. 2. In the non-dazzling region 200, both the brightness of the light emitted by the first lighting module and the brightness of the light emitted by the second lighting module are reduced. Consequently, the segments 201 are reduced in brightness or even completely dark. Adjacent region 202, which is illuminated by the first lighting module, exists on account of the higher resolution of the first lighting module.

Figure 3:
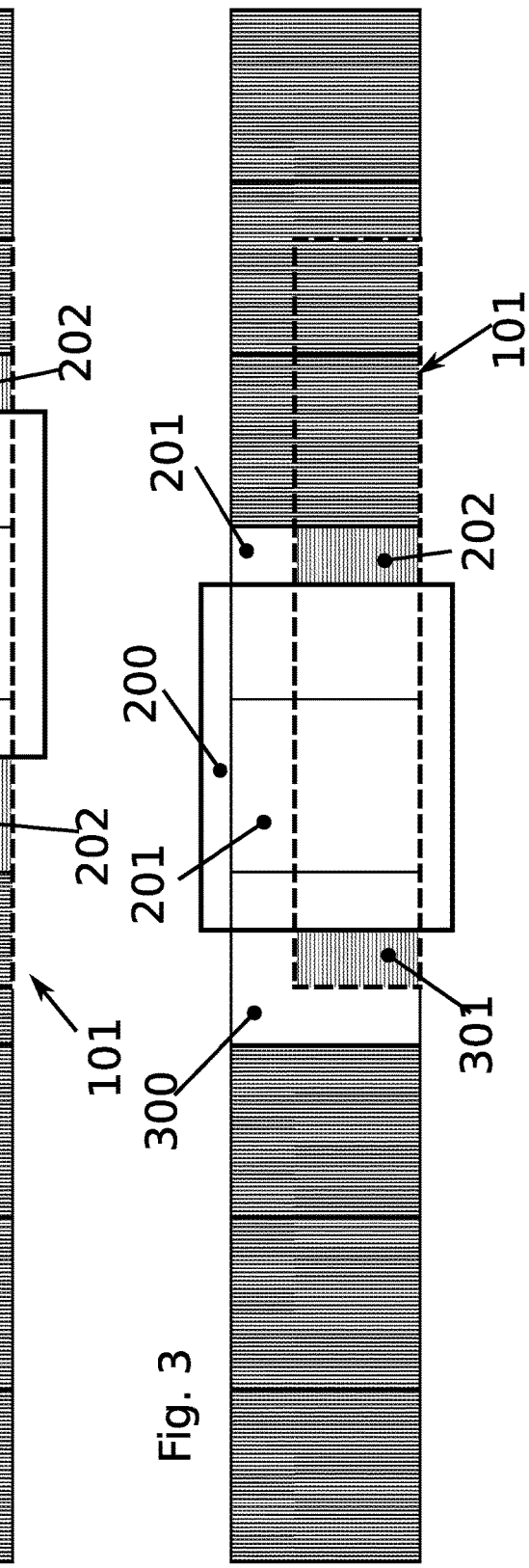
FIG. 3 is a schematic view of a light distribution with a non-dazzling region and a light artifact created with a headlight according to an embodiment of the invention.

In FIG. 3, a light distribution is shown such as occurs in the prior art when an adjacent region 301, which is illuminated by the first lighting module and which is a horizontal edge region of the first region 101, is located horizontally next to the non-dazzling region 200. Since the adjacent region 301 is not part of the non-dazzling region 200, it is illuminated by the first lighting module with unreduced brightness. Since it is a horizontal edge region, however, the illuminated adjacent region 301 does not transition into an illuminated segment 100, but instead into the segment 300 that either is not illuminated or is only illuminated with reduced brightness. The impression thus results for a user that an additional non-dazzling region in the form of a portion of the segment 300 is present in addition to the non-dazzling region 200. A method according to an embodiment of the invention is intended to reduce the risk of such an impression. The illumination of the adjacent region 301 with unreduced brightness can also be referred to as a light artifact. In most cases such light artifacts are undesirable, since they can decrease the concentration of a motor vehicle driver.

A first criterion for avoiding light artifacts is therefore to reduce the illumination of an adjacent region 301 when it is a horizontal edge region of the first region 101. However, if this is the only criterion, even though the risk of light artifacts is reduced, adjacent regions 202 can potentially also be more poorly illuminated, for which this would actually be unnecessary, since no light artifacts are present. Examples of such adjacent regions 202 are shown in FIGS. 4 to 6.

In FIG. 4, two non-dazzling regions 200 are shown, between which is located an adjacent region 202. Even though the adjacent region 202 between the two non-dazzling regions 200 in FIG. 4 is an edge region of the first region 101, illumination of the adjacent region 202 is entirely desirable, since an additional non-dazzling region 200 directly adjoins the adjacent region 202. The additional non-dazzling region 200 thus directly adjoins the first region 101 and the adjacent region 202 in the horizontal direction. As a result, no false impression is produced for a motor vehicle driver that a non-dazzling region could be present when this is not the case. It is thus advantageous to define as a criterion for a reduction in the brightness of the light of the first lighting module emitted toward the adjacent region 202 that there is only a single non-dazzling region 200.

In FIG. 5, a non-dazzling region 200 is shown that directly abuts the first region 101. The adjacent region 202 is illuminated by the first lighting module with unreduced brightness. This is likewise not undesirable in this case, since the adjacent region 202 directly adjoins a segment 100 horizontally that is illuminated by the second lighting module. Consequently, it is also advantageous to adopt as a criterion for the reduction in the brightness of the light emitted by the first lighting module toward the adjacent region 202 that the brightness is only reduced if the adjacent region 202 does not directly adjoin a segment 100 horizontally that is illuminated by the second lighting module with unreduced brightness.

In FIG. 6, two non-dazzling regions 200 are shown, between which is located an adjacent region 202, which is illuminated by the first lighting module with unreduced brightness. This adjacent region 202 also does not represent an undesirable light artifact, since a non-dazzling region 200 is located horizontally next to it on both sides, in similar fashion as in FIG. 4. It is true that one of these non-dazzling regions 200 does not directly adjoin the adjacent region 202, but it is present, so that a motor vehicle driver is not misled. In order to permit the illumination of the adjacent region 202 between the non-dazzling regions with unreduced brightness, it is thus advantageous to adopt the criterion that the brightness of the light emitted by the first lighting module toward the adjacent region 202 is only reduced in the event that the adjacent region 202 has a horizontal extent that is smaller than the horizontal extent of one of the segments 201 or 100.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling two lighting modules of a headlight, wherein a first of the lighting modules is designed to illuminate a first region, wherein a second of the lighting modules is designed to illuminate a second region, and wherein the first region comprises a subregion of the second region, the method comprising:
    defining a non-dazzling region, the non-dazzling region being at least within the second region;
    reducing the brightness of the light emitted by the two lighting modules toward the non-dazzling region;
    determining as to whether an adjacent region exists that directly adjoins the non-dazzling region horizontally and that is a horizontal edge region of the first region; and
    reducing the brightness of the light emitted by the first lighting module toward the adjacent region if the adjacent region has been determined.

2. The method according to claim 1, wherein the brightness of the light emitted by the first lighting module toward the adjacent region is only reduced in the event that solely the non-dazzling region was defined as the only non-dazzling region that directly adjoins the adjacent region horizontally.

3. The method according to claim 1, wherein the brightness of the light emitted by the first lighting module toward the adjacent region is only reduced in the event that the adjacent region does not directly horizontally adjoin a section that is illuminated with unreduced brightness by the second lighting module.

4. The method according to claim 1, wherein the second lighting module comprises multiple lighting segments located horizontally next to one another that are each designed to illuminate one segment of the second region, wherein the brightness of the light emitted by the first lighting module toward the adjacent region is only reduced in the event that the adjacent region has a horizontal extent that is smaller than the horizontal extent of one of the segments.

5. The method according to claim 1, wherein the first lighting module includes multiple light-emitting diodes as light sources.

6. The method according to claim 1, wherein the light-emitting diodes are adapted to be varied in their brightness individually or as groups.

7. The method according to claim 1, wherein the first lighting module is a high-resolution module.

8. The method according to claim 1, wherein the second lighting module is a matrix module.

9. A system comprising:
    a headlight; and
    a control unit,
    wherein the headlight comprises two lighting modules,
    wherein a first of the lighting modules is designed to illuminate a first region,
    wherein a second of the lighting modules is designed to illuminate a second region,
    wherein the first region is a subregion of the second region,
    wherein the control unit is designed to control the lighting modules, and
    wherein the control unit is designed to carry out a method according to claim 1.

10. A motor vehicle comprising a system according to claim 9.

* * * * *